United States Patent
Sekiguchi et al.

(10) Patent No.: US 6,646,697 B1
(45) Date of Patent: Nov. 11, 2003

(54) LIQUID CRYSTAL DISPLAY

(75) Inventors: Kanetaka Sekiguchi, Sayama (JP);
Takashi Akiyama, Sayama (JP);
Masafumi Ide, Tokorozawa (JP);
Masami Kikuchi, Kodaira (JP); Yuichi Akiba, Tokorozawa (JP); Koji Nakagawa, Hachioji (JP); Koichi Hoshino, Omiya (JP); Takashi Toida, Suginami (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/254,937

(22) PCT Filed: Jul. 21, 1998

(86) PCT No.: PCT/JP98/03256

§ 371 (c)(1),
(2), (4) Date: Mar. 17, 1999

(87) PCT Pub. No.: WO99/04315

PCT Pub. Date: Jan. 28, 1999

(30) Foreign Application Priority Data

Jul. 18, 1997 (JP) ............................................... 9-194053
May 14, 1998 (JP) ........................................... 10-131547

(51) Int. Cl.$^7$ .................................................. G02F 1/13
(52) U.S. Cl. ............................................ 349/73; 349/96
(58) Field of Search ............................ 345/96, 98, 7, 345/115, 176

(56) References Cited

U.S. PATENT DOCUMENTS

| | | | |
|---|---|---|---|
| 6,008,871 A | * 12/1999 | Okumura | 349/114 |
| 6,028,656 A | * 2/2000 | Buhrer et al. | 349/74 |
| 6,204,901 B1 | * 3/2001 | Knox | 349/96 |
| 6,215,537 B1 | * 4/2001 | Tsumura et al. | 349/98 |
| 6,243,068 B1 | * 6/2001 | Evanicky et al. | 349/102 |

FOREIGN PATENT DOCUMENTS

| | | |
|---|---|---|
| EP | 0 379 241 | 7/1990 |
| EP | 0 431 795 A2 | 6/1991 |
| EP | 927 917 A1 | 7/1999 |
| JP | 53-1495 | 1/1978 |
| JP | 53-1495 A | 1/1978 |
| JP | 58-144884 | 8/1983 |
| JP | 60-144785 | 7/1985 |
| JP | 61-260202 | 11/1986 |
| JP | 63-101828 A | 5/1988 |
| JP | 1-178927 A | 7/1989 |
| JP | 2-35415 | 2/1990 |

(List continued on next page.)

OTHER PUBLICATIONS

European Search Report dated Oct. 17, 2000.
European Office Action dated Jun. 15, 2001.
Australian Search Report dated Jun. 16, 2000.

Primary Examiner—Toan Ton
(74) Attorney, Agent, or Firm—Armstrong, Westerman & Hattori, LLP

(57) ABSTRACT

A liquid crystal display device is structured in such a manner that plural of liquid crystal display panels each comprised of a liquid crystal layer provided between a pair of transparent substrates which have electrodes disposed on each facing inner surface, and a reflection-type polarizing film is disposed at least on the top surface of the plural liquid crystal display panel, or between the liquid crystal display panels, or on the lowest surface of the plural liquid crystal display panel. By controlling a reflection state and a transmission state through the reflection-type polarizing film with electric voltage applied on the liquid crystal layer of the liquid crystal display panel, a display which represents the opening and closing of a metallic shutter is made possible.

16 Claims, 10 Drawing Sheets

FOREIGN PATENT DOCUMENTS

| | | |
|---|---|---|
| JP | 2-81523 | 6/1990 |
| JP | 4-97134 | 3/1992 |
| JP | 04362917 | 12/1992 |
| JP | 5-346570 | 12/1993 |
| JP | 06273744 A | 9/1994 |
| JP | 6-273744 | 9/1994 |
| JP | 7-142752 | 6/1995 |
| JP | 9-26573 | 1/1997 |
| JP | 9-113893 | 5/1997 |
| WO | WO97/01789 | 1/1997 |
| WO | WO 97/01789 | 1/1997 |

* cited by examiner

LIQUID CRYSTAL DISPLAY

TECHNICAL FIELD

The present invention relates to a liquid crystal display device used to display time information for a timepiece such as hours, minutes, and seconds and calendar information such as date, a day of the week, month, and year in digital form, using a liquid crystal display panel, or to display information from a microcomputer, a memo or the like, or to display information upon receiving a signal from the outside.

BACKGROUND TECHNOLOGY

There exist various electronic equipments and devices to display, using a liquid crystal display panel, time information such as hours, minutes, and seconds, or a memorandum or other information, utilizing memory in a microcomputer such as a PC (a personal computer), a handy computer, a PDA (a personal data assistant), a digital camera, a cellular phone or the like having a communication function.

The liquid crystal display panel in the liquid crystal display device used for these electronic machines and devices can be broadly classified into two groups. One includes liquid crystal display panels using a polarizing film and the other includes types of liquid crystal display panels not using a polarizing film. The present invention relates to a liquid crystal display panel using a combination of a liquid crystal cell with a polarizing film.

Conventionally, this kind of liquid crystal display device performs display by voltage control of the transmission and absorption of light through a liquid crystal layer and a polarizing film.

Here, an example of a conventional liquid crystal display device to display information in digital form will be explained with reference to drawings.

FIG. 17 is a perspective view of a conventional liquid crystal display device used to perform the display of data. FIG. 18 is a schematic sectional view taken along the line 18—18 in FIG. 17. FIG. 19 is an enlarged sectional view of a portion in the liquid crystal display panel in FIG. 18.

A liquid crystal display panel 300 used in this liquid crystal display device includes, in order from the side of glass 2 shown in FIG. 18 (the side visible to a viewer), a first substrate 11, a first electrode 12, a second substrate 13 facing the first substrate 11 at a predetermined distance, and a second electrode 14 provided on the second substrate 13, wherein a portion where the first electrode 12 and the second electrode 14 overlap one another serves as a display pixel.

The first electrode 12 and the second electrode 14 are striped electrodes and are in a matrix-type display pixel arrangement.

A liquid crystal layer 15 exists between the first substrate 11 and the second substrate 13, and the liquid crystal layer 15 is sealed with a sealing agent 33 and a sealant.

An alignment layer is provided on the first substrate 11 and the second substrate 13 to align the liquid crystal layer 15 in a predetermined direction.

For instance, in the case of a twisted nematic liquid crystal, the liquid crystal layer 15 aligns in the direction corresponding to the time 7:30 on the first substrate 11 side, and the time 4:30 on the second substrate 13, and has a twist angle of 90°. When the capacity of data display is required large, a super twisted nematic liquid crystal having an enlarged twist angle from 210° to 260° is sometimes used.

A first polarizing film 21 consists of an absorption-type polarizing film on which a coloring agent is spread in the one direction is provided on the first substrate 11, and a second polarizing film 22 consists of, for example, DBEF (trade name) made by Sumitomo 3M Co., Ltd. is provided as a reflection-type polarizing film on the second substrate 12.

The transmission axes of the first polarizing film 21 and the second polarizing film 22 are disposed parallel with each other and by combination with a liquid crystal panel, a strong reflection state can be shown when the voltage applied to the liquid crystal layer 15 is low, and a transmission state can be shown when the applied voltage is high.

Below the liquid crystal display panel 300, a light source 7 consisting of an electroluminescent element (EL) is provided, and a printed circuit board 5 to apply a predetermined voltage to the liquid crystal display panel 300 and the light source 7 is provided.

On the first substrate 11 forming the liquid crystal display panel 300, an integrated circuit (IC) 96 comprising a driver circuit to drive a liquid crystal display panel is provided and a flexible printed circuit (FPC) 36 is used to connect the printed circuit board 5 and the liquid crystal display panel.

The printed circuit board 5 and the light source 7 are connected through a terminal for a light source (not shown).

The liquid crystal display panel 300 is held with a panel stopper, and is connected to the printed circuit board 5 and the like with a circuit board stopper holding the printed circuit board 5 and the like.

On the side face of the printed circuit board 5, a battery 6 is connected by means of a battery stopping spring 38.

A liquid crystal display device module consisting of the liquid crystal display panel 300 and the printed circuit board 5 is housed in the inside of a case 1 of the liquid crystal display device, having a glass 2 and a case back 3.

The liquid crystal display device having such a structure has a display section 41 shown in FIG. 17, and the display section 41 has a input-letter display section 48 which makes it possible to input on the liquid crystal display panel with an input-pen 10. The liquid crystal display device also has a series of control switches to display information necessary to a viewer.

The liquid crystal display device is provided with buttons such as scroll (+), (−) buttons 51 and 52 to scroll the display, a display mode shifting button 53, and an electric power switch 54 and with a speaker 40 for acoustic information. These control switch or buttons are mounted on a switch board 70 shown in FIG. 18 and are connected with the printed circuit board 5 through a FPC 71.

The display of only the data alone imparts a monotonous design, and further lacks an interesting feature, which leads to loss of popularity among customers.

As is shown in the conventional example, even when a metallic display can be realized by applying a reflection-type polarizing film, a liquid crystal display device which can perform a data display in a variety of designs has been still required.

A method of shielding (opening and closing of a shutter) a portion or all of the data-display section of the liquid crystal display device in accordance with circumstances at the time of use or internal condition of the liquid crystal display device has been studied, but it can not be said sufficient with regard to making the liquid crystal display device thinner and controllable.

It is also required that the closing and opening of a time-display section can be performed by a liquid crystal display device user, a timer, or a signal from the outside through communication, or that display or no display of information can be carried out by using a portion of the time-display section itself as a shutter. However, the above design challenges of such a liquid crystal display device have not been solved.

An object of the present invention is to solve the disadvantages described above and provide a digital-type liquid crystal display device having a variety of designs. Another object of the present invention is to improve the design and provide a variously configurable liquid crystal display device, wherein the time-display section can be closed or opened in accordance with circumstances where the liquid crystal display device is in use, a control signal from a user, or internal conditions of the liquid crystal display device.

DISCLOSURE OF THE INVENTION

To achieve the above described object, a liquid crystal display device according to the present invention is comprised of laminated plural liquid crystal display panels, each of which comprises a liquid crystal layer filled in a gap between a pair of transparent substrates which provide an electrode on each opposing inner surface, and a reflection-type polarizing film which transmits the light linearly polarized in the direction parallel to the transmission axis thereof and reflects the light linearly polarized in the direction orthogonal to the transmission axis thereof, is disposed on at least any surface among the top surface of the plural liquid crystal display panels, between liquid crystal display panels, and the bottom surface of the plural liquid crystal display panels.

Especially, it is preferable that two of the above described liquid crystal display panels are laminated in such a manner that at least a portion thereof is overlaped each other, and the above described reflection-type polarizing film may be disposed at any one position among the top surface of the two laminated liquid crystal display panels, between the two laminated liquid crystal display panels, and the bottom surface thereof.

In such a case, it is desirable to dispose the above described reflection-type polarizing film between the two laminated liquid crystal display panels, i.e., each one of the two liquid crystal display panels has an inner substrate facing the other liquid crystal display panel and an outer substrate placed opposite the other liquid crystal display panel, and the reflective-type polarizing film is disposed between the inner substrates of the two liquid crystal display panels.

The reflection-type polarizing film is preferably disposed in such a manner that the reflection-type polarizing film is adhered to the inner substrate of one of the liquid crystal display panels and a predetermined gap is provided between the reflective-type polarizing film and the inner substrate of the other liquid crystal display panel.

The gap between the above described reflection-type polarizing film and the inner substrate of the other liquid crystal display panel can be formed with a printed layer provided around the display area of the liquid crystal display panel.

A liquid crystal display device according to the present invention can be structured in such a manner that two of the above structured liquid crystal display panels are laminated so that at least a portion thereof is respectively overlaped each other, and a first polarizing film is disposed on the top surface of the two laminated liquid crystal display panels, a second polarizing film is disposed between the two liquid crystal display panels, and a third polarizing film is on the bottom surface, respectively.

Alternatively, a plurality of the above-described reflection-type polarizing films can be disposed.

It is preferable that the top surface of the laminated two liquid crystal display panels is placed on the visible side, and that the first polarizing film is an absorption-type polarizing film to transmit the light linearly polarized in the direction parallel to a transmission axis thereof but to absorb the light linearly polarized in the direction orthogonal to the transmission axis thereof, the second polarizing film is a reflection-type polarizing film, and the third polarizing film is a combination of a light-diffusion layer and the reflection-type polarizing film.

In addition, it is preferable that the first polarizing film, the second polarizing film, and the above described liquid crystal display panel disposed in between, are arranged to have a high transmission characteristic, as opposed to having a high reflection characteristic, in relation to a viewer side, when a voltage applied to the liquid crystal display panel is increased.

It may also be preferable, on the contrary, that the first polarizing film, the second polarizing film, and the liquid crystal display panel disposed in between are arranged to have a high reflection characteristic, as opposed to having a high transmission characteristic, in relation to the viewer side, when a voltage applied to the liquid crystal display panel is increased.

When the high reflection characteristic is shown in relation to the viewer side by the above described first polarizing film, the second polarizing film, and a first liquid crystal display panel disposed in between, low voltage is preferably applied to a second liquid crystal display panel.

Alternatively, in a liquid crystal display device according to the invention, two liquid crystal display panels structured as described above are laminated in such a manner that at least a portion respectively of the two liquid crystal panel is overlaped each other, a first polarizing film is disposed on the upper surface of the first liquid crystal display panel disposed on the viewer side of the laminated two liquid crystal display panels, a second polarizing film is disposed between the first liquid crystal display panel and the second liquid crystal display panel, that is the other liquid crystal display panel, and the third polarizing film is disposed on the bottom surface of the above described second liquid crystal panel, respectively.

The first liquid crystal display panel has a plurality of segment display sections, and when the display shows a high transmission characteristic with the first polarizing film, the second polarizing film and the first liquid crystal display panel, the portion between each segment display section of the first liquid crystal display panel has a steady section in which a high reflection characteristic is constantly maintained when no voltage is applied to the liquid crystal layer.

The second liquid crystal display panel has a display pixel consisting of a matrix-type electrode structure. The display pixel of the second liquid crystal display panel is smaller than the above-described steady section, and a font size displayed by the second liquid crystal display panel can be made larger than the steady section of the first liquid crystal display panel.

Furthermore, a reflection-type polarizing film is disposed between the first liquid crystal display panel and the second liquid crystal display panel, an optical power-generating element which generates electric power on exposure to light is disposed on the bottom side of the second liquid crystal display panel, viewed through the polarizing film, and the display is performed on the first liquid crystal display panel or on the second liquid crystal display panel by means of light having a wavelength area contributing to the power generation of the optical power-generating element so that the electric power generated by the optical power-generating element can be used for power to drive the first and second liquid crystal display panels.

In such a case, a light scattering layer is preferably disposed between the optical power-generating element and the second liquid crystal display panel.

A light-wavelength conversion layer, which absorbs short wavelength light and emits long wavelength light, can be arranged between the above described optical power-generating element and the second liquid crystal display panel.

A liquid crystal display device according to the present invention has at least any one of a sensor which detects a control signal generated by a viewer (user), a sensor to detect the circumstances of use, and a sensor to detect the time at which the liquid crystal display device displays, and a ratio of light incident on the transmission axis of the reflection-type polarizing film to light incident on the reflection axis intersecting the transmission axis at right angles can be varied by the liquid crystal display panel in accordance with a signal output by the sensor.

Alternatively, a sensor which detects a radio wave signal existing in the applied circumstance may also be provided, and in accordance with the signal detected by the sensor and an output signal therefrom, a ratio of light incident on the transmission axis to the light incident on the reflection axis orthogonal to the transmission axis can be varied by the liquid crystal display panel.

The application of voltage to the liquid crystal layers of the above described plural liquid crystal display panels is periodically and continuously conducted and the content displayed on each liquid crystal display panel is slightly shifted so that a three dimensional display can be performed, by means of a positional difference in the laminating direction of each liquid crystal display panel and the deviation of the display.

It is preferable to provide a light source, which emits light upon application of voltage thereto, on the bottom side of the lowest surface of the plural liquid crystal display panel. In such a case, the liquid crystal display panel can be driven in synchronization with the light source.

Alternatively, a fluorescent ink layer which emits light by absorbing light and changing the wavelength thereof can be provided on any place among the light source, on the polarizing film in the lowest layer, or between the above described light source and the polarizing film.

Furthermore, it is preferable to provide a light-diffusion layer consisting of a spacer on at least any one of the bottom side and the top side of the above described reflection-type polarizing film so that the reflection-type polarizing film and a opposing substrate form a gap with the spacer.

BEST MODE FOR CARRYING OUT THE INVENTION

The embodiments of a liquid crystal display device to best carry out the present invention will be hereinafter explained with reference to drawings.

First Embodiment: FIG. 1 to FIG. 6

First, a liquid crystal display device according to the first embodiment of the present invention will be explained with reference to FIG. 1 to FIG. 6.

The liquid crystal display device of the present invention is provided with plural liquid crystal display panels which are laminated in such a manner that at least a portion of the display areas are overlaped each other respectively.

Figure 4:
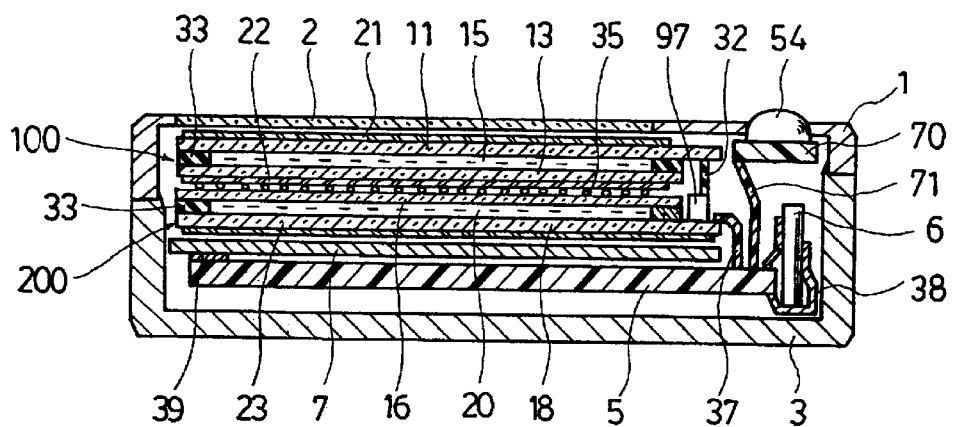
FIG. 4 is a schematic sectional view taken along the line 4—4 in FIG. 2.

In the liquid crystal display device of the first embodiment, as shown in FIG. 4, a first liquid crystal display panel 100 and a second liquid crystal display panel 200 are laminated so that most of the display area of each overlaps the other.

The first liquid crystal display panel 100 consists of a first substrate 11, a first electrode 12 formed in the inner surface thereof, a second substrate 13 facing the first substrate 11 at a predetermined distance, and a second electrode 14 formed in the inside surface of the second substrate 13, in order from the glass 2 side (side visible to a viewer).

The first substrate 11 and the second substrate 13 are transparent glass plates and on the inner facing surfaces of the substrate 11 and 13, the first electrode 12 and the second electrode 14 are formed in predetermined patterns of indium tin oxide (ITO), a transparent conductive material.

A portion in which the first electrode 12 and the second electrode 14 overlap becomes a display pixel. In the first embodiment, the display pixel has a non-divided one-face electrode shape.

A first liquid crystal layer 15 is provided between the first substrate 11 and the second substrate 13, contained therebetween by a sealing agent 33 and a sealant.

Figure 5:
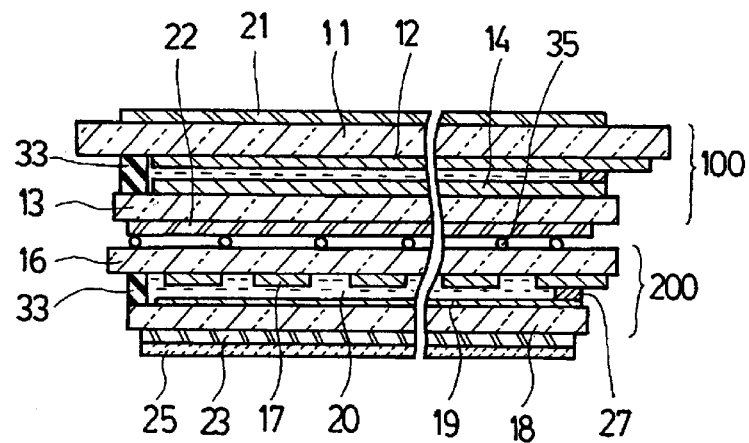
FIG. 5 is an enlarged sectional view of the liquid crystal display panel portion thereof in which a middle portion is broken away.

An alignment layer is provided on the first substrate 11, the second substrate 13, and the first and second electrode 12, 14 shown in FIG. 5, to align the first liquid crystal layer 15 in a predetermined direction.

For instance, when a twisted nematic liquid crystal is used as the first liquid crystal layer 15, the liquid crystals align in the direction corresponding to the time 7:30 on the first substrate 11, and the time 4:30 on the second substrate 13, and the twist angle of the first liquid crystal layer 15 is 90°.

On the first substrate 11 provided is a first polarizing film 21 consisting of an absorption-type polarizing film in which pigments are stretched in the one direction, and on the second substrate 13 provided is a second polarizing film 22 consisting of, for example, DBEF (trade name) manufactured by Sumitomo 3M Co., Ltd. as a reflection-type polarizing film.

The first polarizing film 21 and the second polarizing film 22 are arranged in such a manner that their transmission axes are parallel to each other, and in combination with the liquid crystal display panel 100, they exhibit a strong reflective characteristic when voltage applied to the liquid crystal layer 15 is low, and exhibit a transmission characteristic when high voltage is applied.

The second polarizing film 22 is adhered on the second substrate 13 of the liquid crystal display panel 100 with an adhesive agent.

The structure of the second liquid crystal display panel 200 includes, in order from the glass 2 side (side visible to a viewer), a third substrate 16, a third electrode 17 formed on the inside surface thereof, a fourth substrate 18 which faces the third substrate 16 at a predetermined distance, and a fourth electrode 19 formed on the inside surface thereof. Overlapping portions of the third electrodes 17 and the fourth electrodes 19 are display pixels. In the first embodiment, the third electrodes 17 and the fourth electrodes 19 of the second liquid crystal display panel 200 form a shape of striped electrodes intersecting each other at right angles to be a matrix-form display pixel array.

Between the third substrate 16 and the fourth substrate 18, a second liquid crystal layer 20 is provided and sealed therein by a sealing agent 33 and a sealant.

On the third substrate 16, the fourth substrate 18 and on the third and fourth electrodes 17, 19 shown in FIG. 5, an alignment layer is provided to align the second liquid crystal layer 20 in a predetermined direction.

For instance, when a twisted nematic liquid crystal is used for the second liquid crystal layer 20, the second liquid crystal layer 20 is aligned on the direction corresponding to the time 7:30 in the third substrate 16 side and the time 4:30 on the fourth substrate 18 side, and the twist angle is taken to be 90°. That is, the first liquid crystal layer 15 and the second liquid crystal layer 20 have the same alignment directions and the good viewing directions are the same.

No polarizing film is provided on the third substrate 16 and the second polarizing film 22 is used instead thereof, and an absorption-type polarizing film 23 is arranged as a third polarizing film on the fourth substrate 18.

The first polarizing film 21 and the second polarizing film 22 are disposed in such a manner that their transmission axes intersect with each other, and by combining the liquid crystal display panels 100 and 200, a high transmission characteristic is exhibited when low voltage is applied to the second liquid crystal layer 20, and a high absorption characteristic is exhibited when high voltage is applied.

A spacer 35 is provided between the second polarizing film 22 and the third substrate 16, and it has a structure to provide a gap so as to not allow at least the second polarizing film 22 to be in contact with the third substrate 16. Further, a translucent reflecting film 25 which reflects more than 50% of light and transmits the remainder thereof is provided at the bottom surface of the third polarizing film 23.

It is possible to change the ratio of the transmittance to the reflectance of the translucent reflecting film 25 by controlling the thickness of silver (Ag), used therein as a reflecting film.

A light source 7 which consists of an electroluminescent (EL) element is disposed on the bottom of the second liquid crystal display panel 200, and the printed circuit board 5 to apply a predetermined voltage to the first and second liquid crystal display panels 100, 200 and the light source 7 is further provided.

For connecting the printed circuit board 5 to the first liquid crystal panel 100, at first, by using a zebra-rubber connector 32, the first liquid crystal panel is connected to the fourth substrate 18 of the second liquid crystal panel 200. Then, they are in turn connected to the printed circuit board 5 through a flexible printed circuit (FPC) 37 attached to the fourth substrate 18.

The connection of the printed circuit board 5 with the second liquid crystal display panel 200 is carried out by the face-down mounting on the fourth substrate 18 of a panel driver IC for driving the liquid crystal display panel, using a chip-on-glass method (COG) and connected through the FPC 37.

Since the second electrode 14 on the second substrate 13 is transferred to the first substrate 11, using a conductive sealing material, a signal connection to the first liquid crystal display panel 100 is completed by connecting to an electrode on the first substrate 11. Therefore, this structure of mounting can be said to be a suitable mounting means for the first liquid crystal display panel 100 and the second liquid crystal display panel 200.

The second polarizing film 22 is adhered on the bottom surface of the second substrate 13 with an adhesive agent, and between the second polarizing film 22 and the third substrate 16 the spacer 35 made of plastic beads is spread.

By not bonding the second polarizing film 22 and the third substrate 16, it becomes easy to position the first liquid crystal display panel 100 and the second liquid crystal display panel 200. Furthermore, occurrence of bubbles between the second polarizing film 22 and the third substrate 16 can be prevented.

Because the second polarizing film 22 is a reflection-type polarizing film, the occurrence of distortion in the second polarizing film 22 becomes visible even if it is a small distortion such as that which is invisible in the conventional absorption-type polarizing film.

Therefore, it is important to provide a spacer (gap) between the second polarizing film 22 and the third substrate 16.

In order to obtain a mirror characteristic on the first liquid crystal display panel, it is not preferable to spray the spacer between the second substrate 13 and the second polarizing film 22 due to a lessening thereby of the mirror characteristic.

Further, the occurrence of distortion in the second polarizing film 22 lowers the display quality.

The gap between the second polarizing film 22 and the third substrate 16 depends on the uniformity of area and thickness between the second substrate 13 and the third substrate 16, or the uniformity of thickness between the second polarizing film 22 and the adhesive layer. Since the size is limited in the case of the liquid crystal display device, the gap is limited by an amount of the sprayed plastic beads. If the amount of beads is greater than 10 pcs/mm$^2$, the gap in a range between 5 to 100 micrometers ($\mu$m) is suitable, and in a range between 10 to 50 micrometers ($\mu$m) is more suitable to prevent the display quality of the second liquid crystal display panel 200 from lowering.

When the gap is small, interference fringes break out due to close proximity of the second polarizing film 22 with the third substrate 16.

When the gap is large, on the contrary, since the distance between the second polarizing film 22 and the translucent reflecting film 25 becomes large, so that the display of the second liquid crystal display panel becomes unclear. By setting the height of the spacer 35 to be within the above-described values, an excellent display can be obtained.

Figure 1:
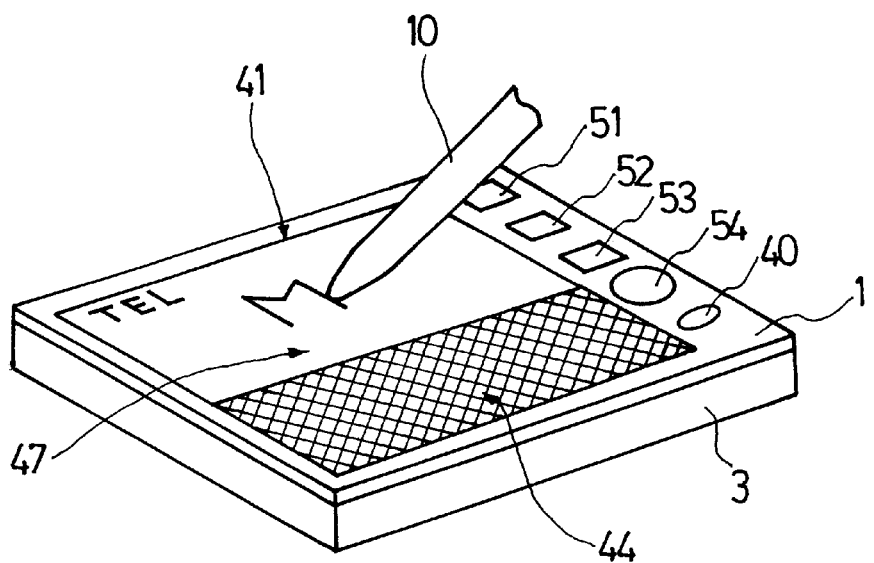
FIG. 1 is a perspective view of a liquid crystal display device showing a first embodiment of the present invention.

The battery 6 is fixed with a battery stopper 38 on the side wall of the printed circuit board 5. On the printed circuit board 5, as shown in FIG. 1 to FIG. 3, a scroll up (+) botton 51 and a scroll down (−) button 52, a display mode shifting switch 53, a power switch button 54, and a speaker 40 are provided to allow user input of commands, and the buttons or switches are connected to the printed circuit board 5 through a switch board 70 and a switch-use FPC 71.

Thus, a liquid crystal display module having a two-layer structure of the first liquid crystal display panel 100 and the second liquid crystal display panel 200 is assembled.

Figure 2:
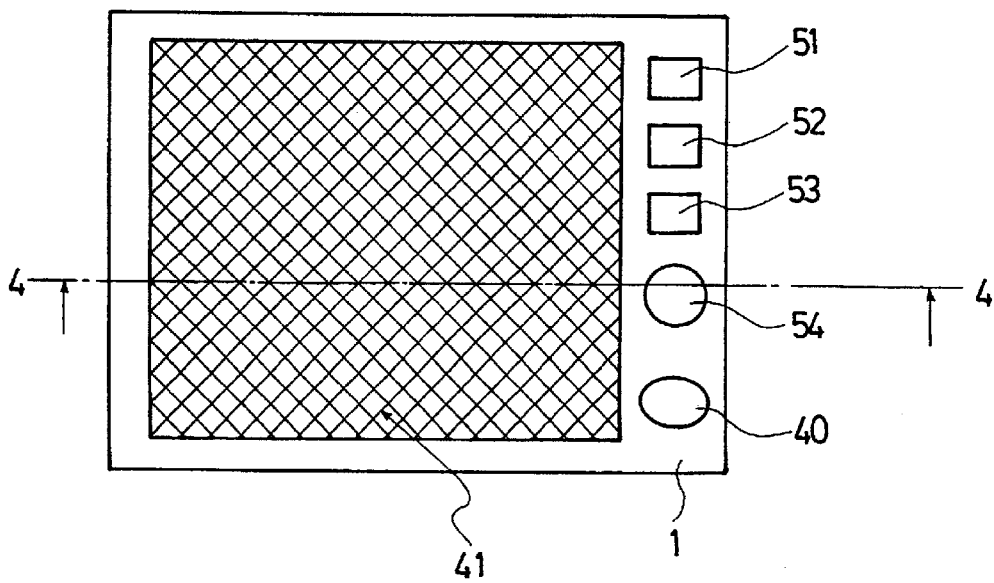
FIG. 2 is a plane view showing a shutter-closed state of the liquid crystal display device.
Figure 3:
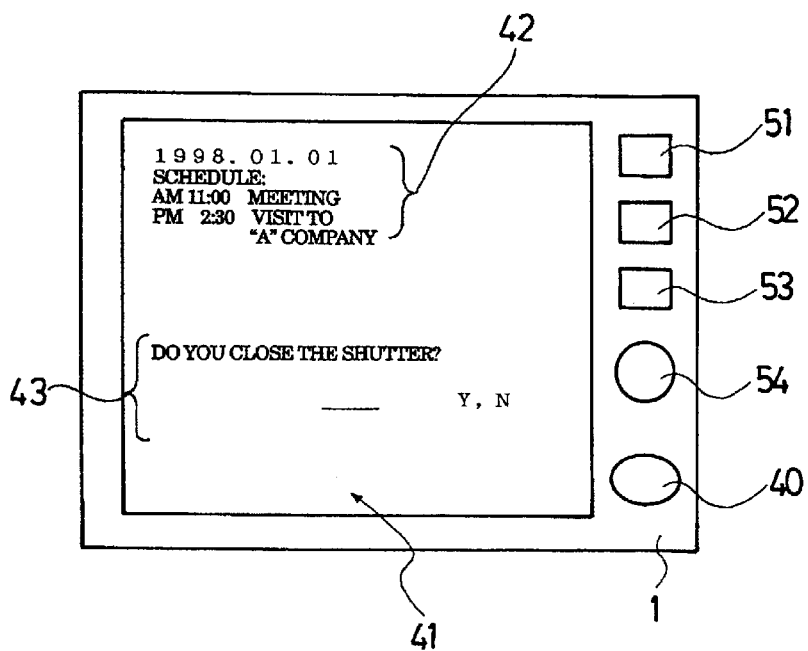
FIG. 3 is a plane view similarly showing a shutter-opened state.

The liquid crystal display device thus structured has a shutter-display section 41 (FIG. 1 to FIG. 3) which consists of an undivided electrode structure having an area of the first liquid crystal display panel 100 larger than the area of the display section of the liquid crystal display panel 200, and becomes a shutter display 44 which has an uniform display as shown in FIG. 2 and which shows a strong reflective characteristic when no voltage or low voltage is applied on the first liquid crystal layer 15.

At this time, the first liquid crystal display panel 100 serves as a closed shutter to shield the display of the second liquid crystal display panel 200.

Next, as shown in FIG. 3, a schedule display 42 to show information in the memory IC and a shutter-control display 43 are shown on the display section of the second liquid crystal display panel to be waiting a command to open or close of the shutter.

By selecting "Y" on the shutter-control display 43, the shutter function of the first liquid crystal display panel 100 operates as shown in FIG. 1, and a change in shutter display 44 from a transmission state to a reflection state is displayed on a part of the display section, and a shutter-state display 47 in a secret (closing) operation is put on.

In order to divide the shutter display section 41 into two parts, the gap of the first liquid layer 15 is made step-wise in this embodiment.

When high voltage is gradually applied on the first liquid crystal layer 15 which comprises the first liquid crystal display panel 100, the shutter takes an open state with even a low voltage applied at the place where the gap of the first liquid crystal layer 15 is small.

On the contrary, where the gap is large, the shutter remains in a closed state until it reaches a high voltage condition.

By making the voltage applied to the first liquid crystal display panel 100 higher, it is controlled to a state of transmittance over its entire area, and as shown in FIG. 3, all of the surface of the display section of the second liquid crystal display panel 200 can be seen as the shutter display section 41 is controlled to a full-open state.

A pen-input type input device is provided on the glass 2 in this embodiment. The pen-input type input device has a pressure-sensitive system and an electromagnetic induction system, and the pressure-sensitive system is advantageous because of its portability and cost-performance.

There is a resistance film method utilized in the pressure-sensitive system. The method is performed in a manner wherein two sheets of thin film substrate face each other divided by a spacer therebetween, and a high-resistance transparent conductive film is formed on each facing surface of the two sheets of the substrate and a position where the upper and lower transparent conductive films are brought into contact with each other by an applied pressure is computed from the resistance value.

It becomes possible to arrange an input device on the display section by using a pen-input type input device utilizing an input pen 10. But, the pressure is transferred to the first liquid crystal display panel 100, and further to the second liquid crystal display panel 200 and puts pressure on the gap between the second polarizing film 22 and the third substrate 16.

However, by providing the spacer 35 made of plastic beads in a gap between the second polarizing film 22 and the third substrate 16, a uniform gap can be maintained, and the lowering of display visibility due to interference fringes does not occur.

Figure 6:
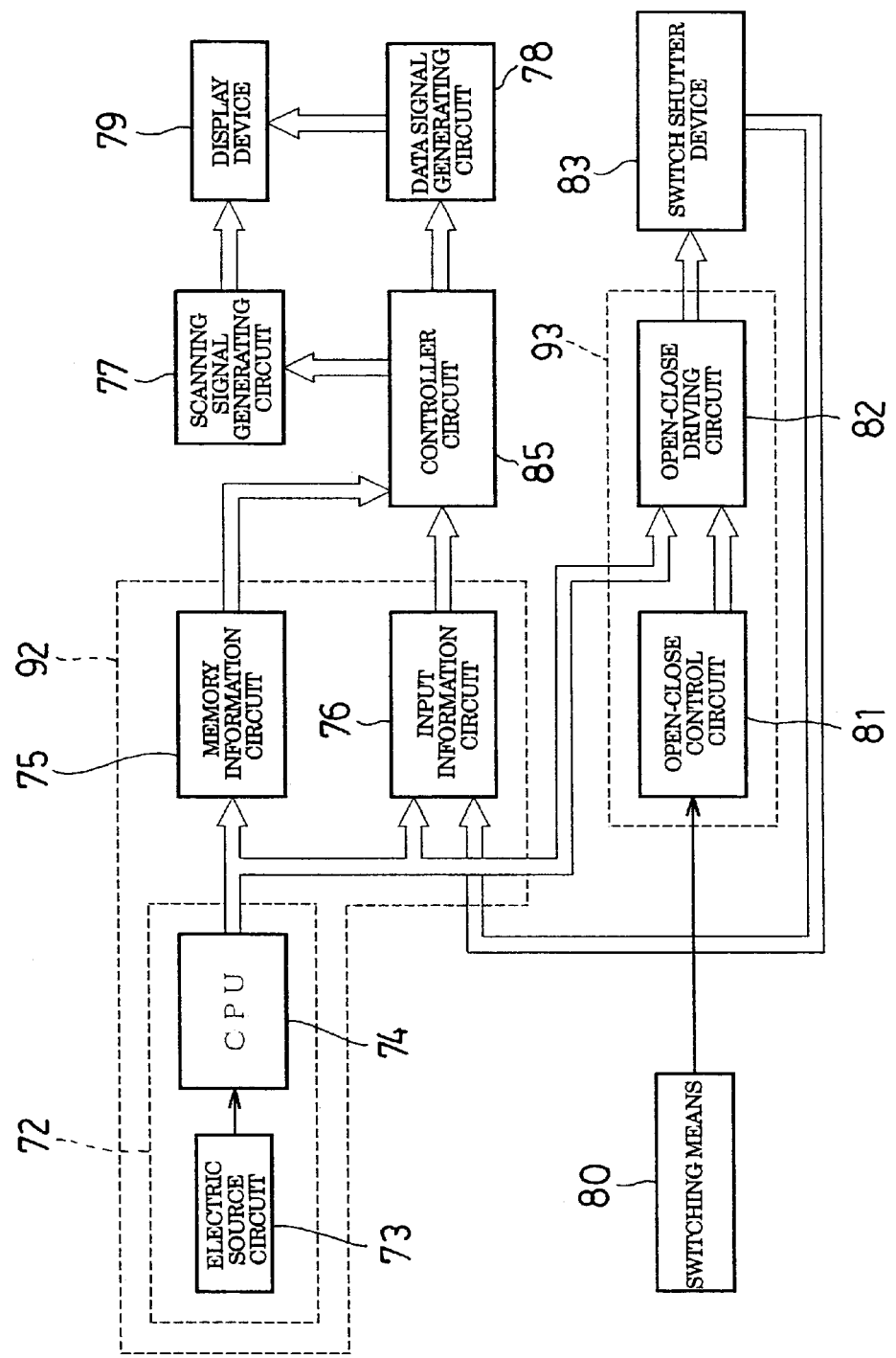
FIG. 6 is a system block diagram of the liquid crystal display device of the first embodiment of the present invention.

Next, the function of the first embodiment will be explained with reference to a system block diagram shown in FIG. 6.

An information-generating means 92 consists of a standard signal generating circuit 72, a memory information circuit 75, and an input information circuit 76, and the standard signal generating circuit 72 is structured with a power source circuit 73 and a central processing circuit (CPU) 74. The CPU 74 performs each kind of signal processing based on a clock signal (several ten megaHz).

A bidirectional processing is performed with the memory information circuit 75 or the input information circuit 76, so that the information necessary for the display of the display device (the second liquid crystal display panel) 79 is supplied.

Information from the memory information circuit 75 and the input information circuit 76 is converted into a predetermined signal by a CPU 74, transferred to a controller circuit 85, outputted to a scanning signal generating circuit 77 and a data signal generating circuit 78, and input to the display device 79.

Thus, memory information, information from pen-input type input device, shutter information and so on are displayed.

Next, a shutter display section that is a display of the first liquid crystal display panel 100 will be explained. In order to drive a switch shutter device 83 (the first liquid crystal display panel) in the shutter unit to behave as a shutter, a switch signal output from a switching means 80 is output as a control signal to a shutter controlling means 93 consisting of an open-close control circuit 81 to control a strong reflection state (shutter closing) and a full transmission state (shutter opening) on the display of the first liquid crystal display panel, and an open-close driving circuit 82 to drive a switch shutter device 83 that is the first liquid crystal display panel 100.

The switch means 80 utilizes a signal inputted by a pen-input type input device in the first embodiment.

As explained above, a characteristic of the first embodiment is to provide the second polarizing film 22 between the first liquid crystal display panel 100 and the second liquid crystal display panel 200, and the second polarizing film 22 is a reflection-type polarizing film which is adhered to the second substrate 13.

A predetermined gap filled by spacer made of spherical plastic beads is provided between the second polarizing film 22 and the third substrate 16, which prevents the occurrence of interference fringes caused by the second polarizing film 22 and the third substrate 16, and makes it easy to position the first liquid crystal display panel and the second liquid crystal display panel.

Furthermore, it becomes possible to prevent distortion of the second polarizing film 22 and to improve the display quality of the second liquid crystal display panel by adopting plastic beads as a spacer and by optimizing the amount of the beads.

In addition, it becomes possible to perform a mirror display in a fully closed shutter state with small power consumption by the liquid crystal display device by making the number of the display pixels of the first liquid crystal display panel small and the number of the display pixels of the second liquid crystal display panel large and by making the first liquid crystal display panel to be in a state of shutter closed display with no voltage applied.

In addition, by forming the second liquid crystal display panel as a matrix type, the power consumption can be adjusted as necessary.

Figure 7:
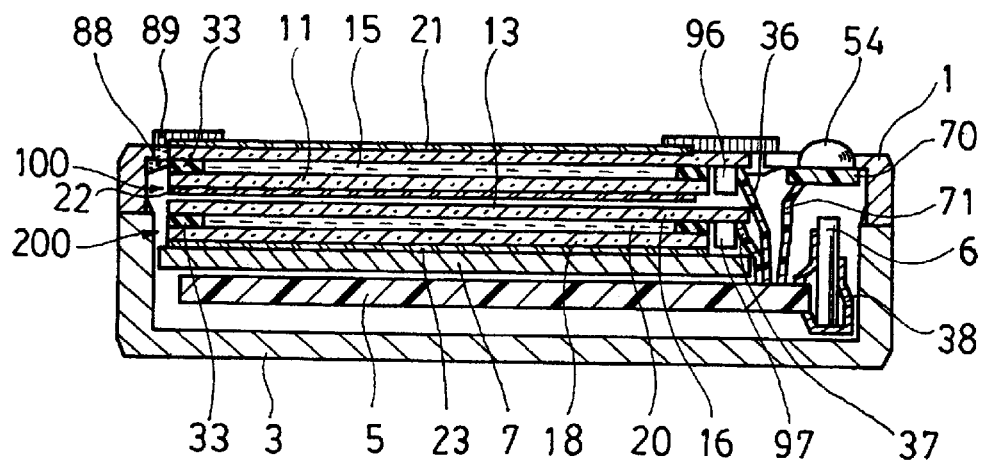
FIG. 7 is a schematic sectional view of a liquid crystal display device showing a second embodiment of the present invention.
Figure 8:
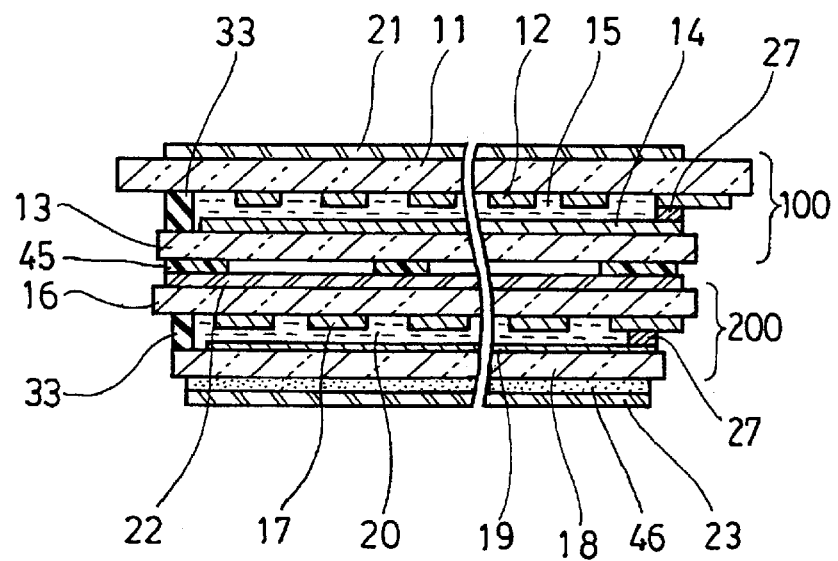
FIG. 8 is an enlarged sectional view of the liquid crystal display panel portion thereof in which a middle portion is broken away.

Second Embodiment: FIG. 7, FIG. 8

Next, a liquid crystal display device according to the second embodiment of the present invention will be explained with reference to FIG. 7 and FIG. 8. In these drawings, the same reference numerals are used to the same portion as these are used as in the explanation of the above described first embodiment in FIG. 4 and FIG. 5, and the explanation thereof is omitted.

In the second embodiment, a feature different from the first embodiment is that a spacer 45 consisting of a printed layer is provided between the second substrate 13 and the second polarizing film 22, and the second polarizing film 22 is adhered on the third substrate 16.

Another feature is such that a diffusion layer 46 and the third polarizing film 23 are disposed on the bottom side of the fourth substrate 18. Still another feature is that no glass 2 is provided on the viewer side of the liquid crystal display device, the case 1 and the first substrate 11 have an equal surface height, and acrylic resin 88 is filled in the border portion of the first substrate 11 and the case 1. Yet another feature is that a printed layer 89 is provided on the first polarizing film 21 of the first substrate 11 and the case 1.

A reflection-type polarizing film is used as the second polarizing film 22 and as the third polarizing film 23.

Furthermore, as shown in FIG. 8, the first and second electrodes 12, 14 of the first liquid crystal display panel 100 are formed in a striped manner and are arranged such that the electrode stripes intersect with each other at right angles, and the display pixels are formed thereby in a matrix form at a plurality of intersection points of the striped electrodes.

The first polarizing film 21 consisting of an absorption-type polarizing film is disposed on the first substrate 11 of the first liquid crystal display panel 100, and on the second substrate 13 the spacer 45 consisting of a printed layer is provided to occupy a predetermined gap between second substrate 13 and the second polarizing film 22 on the third substrate 16 of the liquid crystal display panel 200.

The printed layer serves as, for instance, a panel cover for the first liquid crystal display panel 100 or a panel cover for the second liquid crystal display panel 200, and the spacer 45 for the second polarizing film 22.

The second liquid crystal display panel 200 is the same as the second liquid crystal display panel 200 in the first embodiment. The second polarizing film 22 is adhered on the third substrate 16 of the second liquid crystal display panel 22 with an adhesive agent.

On the fourth substrate 18, provided are a diffusion layer 46 which diffuses light by means of mixed beads of different refractive indexes in the adhesive agent, and a reflection-type polarizing film adhered with the diffusion layer 46.

By disposing the second polarizing film 21 and the third polarizing film 22 in such a manner that their transmission axes intersect at right angle, and by combining the above with the second liquid crystal display panel 200, a full transmission characteristic is displayed when a low voltage is applied to the second liquid crystal layer 20, and a strong reflection characteristic having also a diffusion characteristic due to the diffusion layer 46 is displayed when a high voltage is applied.

The third polarizing film 23 is a reflection-type polarizing film and by disposing the diffusion layer 46 between the fourth substrate 18 and the third polarizing film 23, light transmitted through the second polarizing film 22 is allowed to reach the third polarizing film 23 through the diffusion layer 46, and the light is reflected toward the second polarized film 22 side.

Further, since the first liquid crystal display panel 100 shows a reflection state and a transmission state, when the first liquid crystal display panel 100 performs a display having a portion in a reflection state and a portion in a transmission state, the second liquid crystal display panel 200 shows a diffusion state or transmission state, whereby a difference from the display of the first liquid crystal display panel 100 is emphasized, and display visibility of the second liquid crystal display panel 200 is improved.

Since the third polarizing film 23 has a reflection characteristic, loss of light, such as loss caused by a translucent reflecting film, is avoided, and suitable reflection corresponding to the polarized light through the second polarizing film 22 and the second liquid crystal layer 20 can be performed, thereby a bright display is realized.

By providing a fluorescent printed layer (not shown) on the bottom of the third polarizing film 23, and adopting colors in the visible long wave-length side as the colors of the fluorescent printed layer, a display in bright and attractive colors becomes possible when the first liquid crystal display panel 100 is in a transmission state and the second liquid crystal display panel 200 is also in a transmission state.

In the liquid crystal display device having the above structure, a light source 7 composed of an electroluminescent (EL) element is disposed under the second liquid crystal display panel 200, and a printed circuit board to apply a predetermined voltage to the liquid crystal display panel and the light source 7 is provided.

As shown in FIG. 7, the surface of the first substrate 11 and the surface of the case 1 of the liquid crystal display device are nearly the same in height. In the ordinary liquid crystal display device, a liquid crystal display panel is disposed below the glass, which makes the display appear within rather than on the display. Therefore, there has been a pursuit of a design wherein the liquid crystal display panel and the case 1 have the same surface height.

However, in the conventional one-layer liquid crystal display panel structure, use of the key device of the display to serve also as the glass has been avoided. By making the liquid crystal display device in a multilayer structure, and limiting the use of the liquid crystal display panel which is disposed on the viewer side, it becomes possible to prevent the display quality from deteriorating under the above configuration.

In the second embodiment, the first liquid crystal display panel 100 is fixed to the case 1 with acrylic resin 88, and the air-tightness therein is secured. Further, a printed layer 89 to perform shielding is provided on a portion of the case 1, the first substrate 11 and the first polarizing film 21. The printed layer 89 can prevent the peeling off of a laminated portion of the first polarizing film 21, or peeling of the first substrate 11, and protect the assembly from humidity by shielding the resin 88 which fixes the first liquid crystal display panel 100 to the case 1.

As described above, a plurality of liquid crystal display panels are used, and a portion of polarizing film is commonly used on the first liquid crystal display panel 100 and the second liquid crystal display panel 200. The polarizing film is a reflection-type polarizing film, in order to improve the brightness of the first liquid crystal display panel 100 with reflection by the third polarizing film 23 and the second polarizing film 22.

Figure 9:
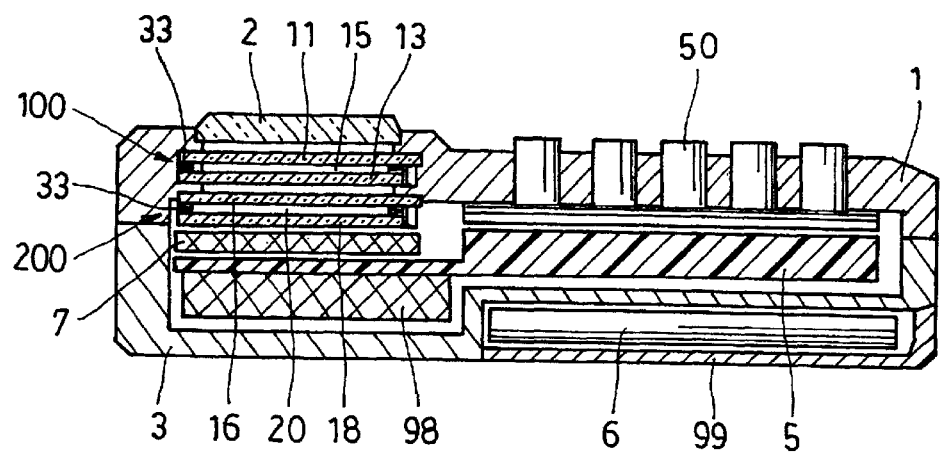
FIG. 9 is a schematic sectional view of a liquid crystal display device showing a third embodiment of the present invention.
Figure 10:
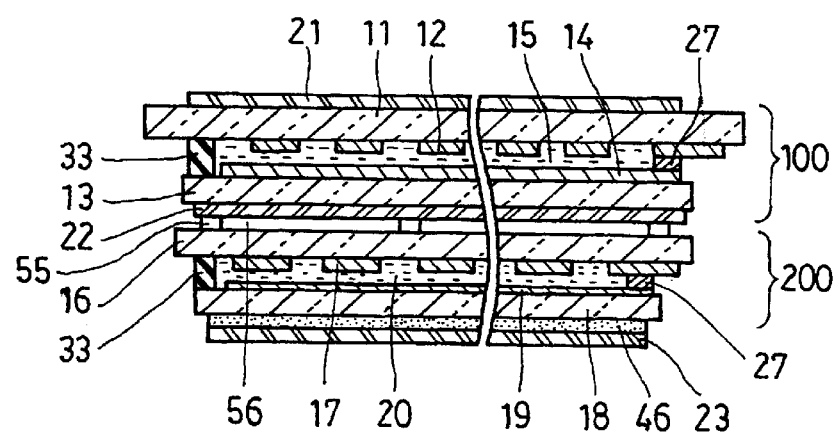
FIG. 10 is an enlarged sectional view of the liquid crystal display panel portion thereof in which the middle portion is broken away.

Third Embodiment: FIG. 9, FIG. 10

Next, a liquid crystal display device according to the third embodiment of the present invention will be explained with reference to FIG. 9 and FIG. 10. In these drawings, the same numerals are used as for the same or corresponding portions in the drawings for the first, and the second embodiments explained hereinbefore, and an explanation thereof is omitted.

In the liquid crystal display device according to the third embodiment, an arrangement of a first liquid crystal display panel 100 and a second liquid crystal display panel 200 is, as shown in FIG. 10, nearly the same as that of the second embodiment shown in FIG. 8.

And no polarizing film is placed on a third substrate 16 of the second liquid crystal display panel 200, and a second polarizing film 22 is used instead thereof. On a fourth substrate 18, a diffusion layer 46 and a third polarizing film 23 consisting of a reflection-type polarizing film is provided.

The second polarizing film 22 and the third polarizing film 23 are arranged in such a manner that their transmission axes intersect at right angles, and combined with a second liquid crystal layer 20, they have a high transmission characteristic when voltage applied to the liquid crystal layer 15 is low, and have a strong reflection characteristic when high voltage is applied.

A printed layer 55 formed on the third substrate 16 is provided between the second polarizing film 22 and the third substrate 16, and the second polarizing film 22 and the third substrate 16 are separated by a predetermined gap 56.

According to the above-described structure, a module of the liquid crystal display device having a two-layer structure consisting of the first liquid crystal display panel 100 and the second liquid crystal display panel 200 is provided.

As shown in FIG. 9, the first and second liquid crystal display panels 100 and 200 so arranged are held by a case 1, a glass 2, and a case back 3 of a cellular phone. A light source 7 is provided below the second liquid crystal display panel 200 and the light source 7, a transmitting/receiving circuit 98, a battery 6 and a key-switch 50 for the input of a command or information are connected to the printed circuit board 5 directly or through a switch. The battery 6 is held by a battery cover 99.

Figure 11:
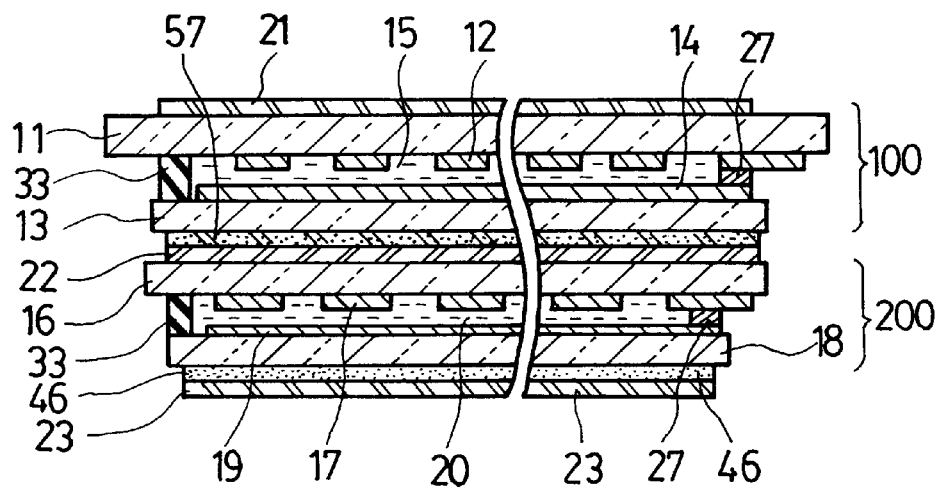
FIG. 11 is an enlarged sectional view of a liquid crystal display panel portion of a liquid crystal display device showing a fourth embodiment of the present invention, in which a middle portion is broken away.

Fourth Embodiment: FIG. 11

The fourth embodiment of the present invention will next be explained, with reference to FIG. 11.

FIG. 11 is an enlarged sectional view of the liquid crystal display panel in which a middle portion is broken away.

The characteristic feature of the fourth embodiment lies in that a second substrate 13 and a second polarizing film 22 are adhered with an adhesive agent, and a diffusion layer 57 is provided between the second polarizing film 22 and a second substrate 13. Below a fourth substrate 18, the diffusion layer 46 and a third polarizing film 23 are disposed. The second polarizing film 22 and the third polarizing film 23 are a reflection-type polarizing film.

Since other aspects of the embodiment are the same as those in the aforementioned second embodiment, the explanation thereof will be omitted.

In this liquid crystal display device, the occurrence of interference fringes caused by contact of the second polarizing film 22 with the third substrate 16 can be prevented, and whiteness of the second liquid crystal display panel is emphasized, as the diffusion layer 57 is provided between the second polarizing film 22 and the second substrate 13.

Further, a reflection-type polarizing film is used as the third polarizing film 23, and a diffusion layer 46 is disposed between a fourth substrate 18 and the third polarizing film 23 so that light penetrating through the second polarizing film 22 reaches the reflection-type polarizing film, that is the third polarizing film 23, effectivelly through the diffusion layer 46, and the light is reflected thereby toward the second polarizing film 22 side.

Since the first liquid crystal display panel 100 shows a reflection state and a transmission state, when the first liquid crystal display panel 100 displays a portion in a reflection state and a portion in a transmission state simultaneously, a virtual contrast ratio is higher when the second liquid crystal display panel 200 shows a diffusive state and a transmission state, and thus the visibility of the display of the second liquid crystal display panel 200 can be improved.

Since the third polarizing film 23 has a reflection characteristic, loss of light can be further reduced as compared with the case of using a translucent polarizing film. In other words, since the suitable reflection for polarized light of the second polarizing film 22 and the second crystal liquid layer 20 can be utilized, a bright display can be realized.

A fluorescent printed layer is provided on the bottom of the third polarizing film 23, and a color having a wavelength in the visible long wave-length range side is adopted for the color of the fluorescent print-layer, whereby a bright display in an attractive color becomes possible when the first liquid crystal display panel 100 is in a transmission state and the second liquid crystal display panel 200 is also in a transmission state.

Figure 12:
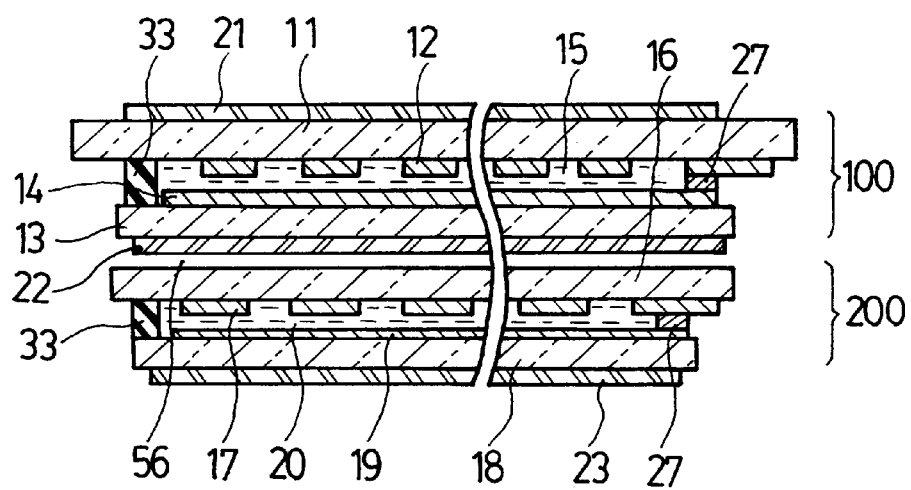
FIG. 12 is an enlarged sectional view of a liquid crystal display panel portion of a liquid crystal display device showing a fifth embodiment of the present invention, in which a middle portion is broken away.

Fifth Embodiment: FIG. 12

Next, the fifth embodiment of the present invention will be explained with reference to FIG. 12.

FIG. 12 is an enlarged sectional view of the liquid crystal display panel of the liquid crystal display device in which a middle portion is broken away.

A characteristic feature of the fifth embodiment is such that a second substrate 13 and a second polarizing film 22 are bonded together with an adhesive agent and a gap (an air layer) 56 is provided between the second polarizing film 22 and a third substrate 16. Below a fourth substrate 18, a reflection-type polarizing film is disposed as a third polarizing film 23.

Since other aspects are here the same as those in the second embodiment, explanation thereof will be omitted.

By providing the gap 56 between the second polarizing film 22 and a third substrate 16 of the second liquid crystal display panel 200 in this liquid crystal display device, the occurrence of interference fringes caused by contact of the second polarizing film 22 with the third substrate 16 is avoided.

To establish the gap 56 (air layer), a protrusion is provided on a portion of a panel stopper to fix the first liquid crystal display panel 100 and the second liquid crystal display panel 200, and by inserting the protrusion between the first liquid crystal display panel 100 and the second liquid crystal display panel 200, the fixing of the liquid crystal display panels 100 and 200 and the formation of the gap 56 can be performed at the same time.

The second liquid crystal display panel 200 can possess a large reflection characteristic when the second polarizing film 22 and the third polarizing film 23 consist of a reflection-type polarizing film, whereby the reflection characteristic of the first liquid crystal display panel 100 can be enhanced.

Especially, when the second liquid crystal display panel 200 has not a segment electrode structure, and, in place of it, has a third electrode 17 and a fourth electrode 19 formed in a striped electrode structure, and an intersection point of the striped electrode structure comprises a pixel electrode, it becomes possible to reversibly shift a large area of the display into a transmission state or a reflection state. Therefore, in a portion of the first liquid crystal display panel 100 in a reflection state, an excellent reflection characteristic can be achieved when the second liquid crystal display panel 200 is also in a reflection state.

Furthermore, even when the display state of the first liquid crystal display panel 100 is in a transmission state (shutter open), an aftereffect of the reflection state of the first liquid crystal display panel 100 can be remained by displaying a reflection state and a transmission state through the second liquid crystal display panel 200.

In other words, the reflection characteristic of the first liquid crystal display panel 100 is reinforced by utilizing the reflection characteristic of the second liquid crystal display panel 200, and a portion being in a transmission state can appear in a full reflection state owing to a corresponding pixel of the second liquid crystal display panel 200 in a reflective state.

Since the light absorbed by a conventional polarizing film can be emitted again to the viewer side by utilizing a multiple reflection by the second polarizing film 22 and the third polarizing film 23, a bright display can be realized with a liquid crystal display panel having a double structure.

Figure 13:
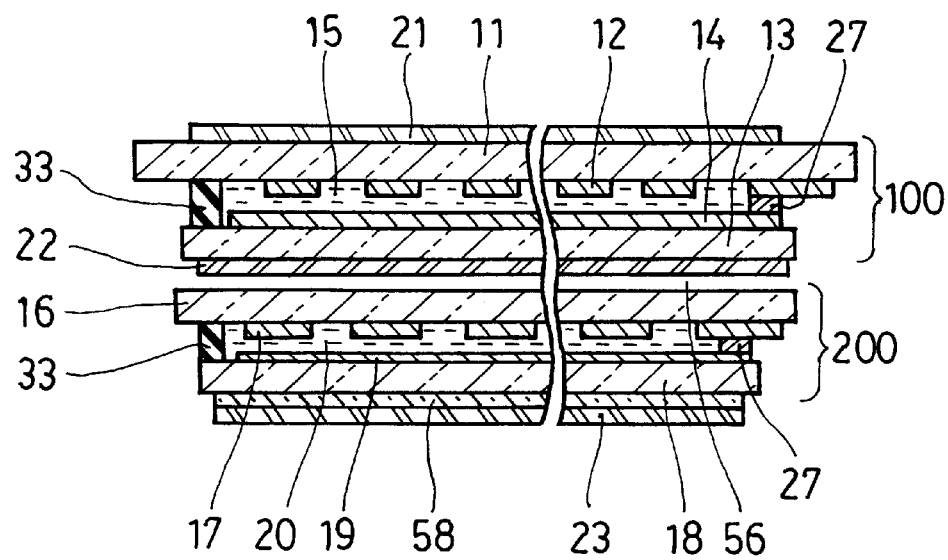
FIG. 13 is an enlarged sectional view of a liquid crystal display panel portion of a liquid crystal display device showing a sixth embodiment of the present invention, in which a middle portion is broken away.

Sixth Embodiment: FIG. 13

Next, the sixth embodiment of the present invention will be explained with reference to FIG. 13.

FIG. 13 is an enlarged sectional view of the liquid crystal display panel portion of the liquid crystal display device in which a middle portion is broken away.

A characteristic feature of the fifth embodiment is such that a second substrate 13 and a second polarizing film 22 are bonded together with an adhesive agent and a gap (an air layer) 56 is provided between the second polarizing film 22 and a third substrate 16. Below a fourth substrate 18, a reflection-type polarizing film is disposed as a third polarizing film 23. Another feature is to provide a color filter 58 between the fourth substrate 18 and the third polarizing film 23.

Since other configurations are the same as that in the second embodiment, the explanation thereof will be omitted.

In this liquid crystal display device, a reflection-type polarizing film adhered by means of an adhesive agent is provided as the third polarizing film 23 con the fourth substrate 18 of a second liquid crystal display panel 200. Further, a color filter 58 is provided between the third polarizing film 23 and the fourth substrate 18.

By providing the color filter 58, a bright reflection color can be achieved, utilizing the reflection characteristic of the third polarizing film 23. By using a multiple color filter as the color filter 58, a variety of designs can be achieved and the design is further improved through a synergistic effect of the opening and closing of the first liquid crystal display panel 100. In addition, by making the color filter 58 to be a fluorescent printed layer, a bright color can be realized.

By providing a gap 56 between the second polarizing film 22 and a third substrate 16, the occurrence of interference fringes caused by contact of the second polarizing film 22 and the third substrate 16 is avoided.

The second liquid crystal display panel 200 can possess a large reflection characteristic when the second polarizing film 22 and the third polarizing film 23 consist of a reflection-type polarizing film, whereby the reflection characteristic of the first liquid crystal display panel 100 can be enhanced. This effect is the same as that in the case of the aforementioned fifth embodiment.

Figure 14:
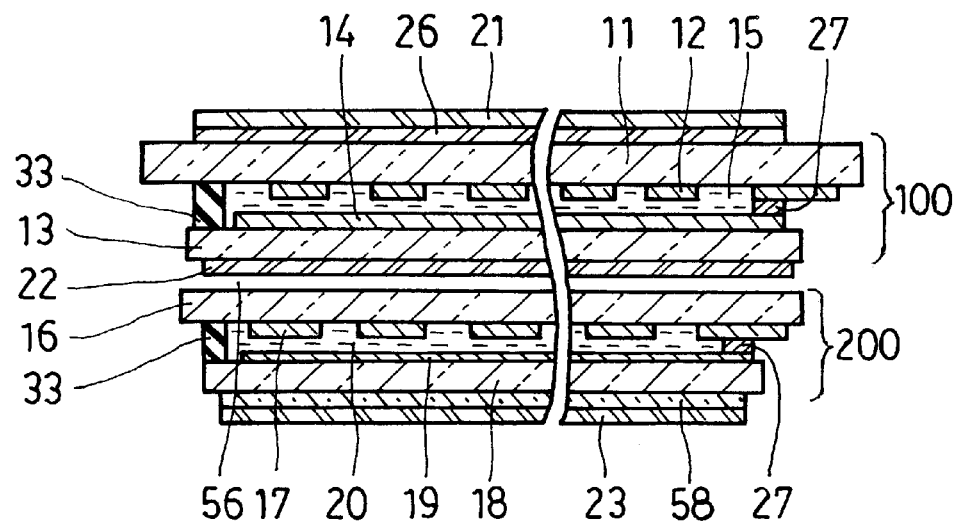
FIG. 14 is an enlarged sectional view of a liquid crystal display panel portion of a liquid crystal display device showing a seventh embodiment of the present invention, in which a middle portion is broken away.

Seventh Embodiment: FIG. 14

Next, the seventh embodiment of the present invention is explained with reference to FIG. 14.

FIG. 14 is an enlarged sectional view of the liquid crystal display panel portion of the liquid crystal display device in which a middle portion is broken away.

One of the characteristics of the seventh embodiment is that a polarizing film formed of two layers of a reflection-type polarizing film and an absorption-type polarizing film is used for a first polarizing film 21. A second substrate 13 and a second polarizing film 22 are adhered with an adhesive agent and a gap (air layer) 56 is provided between the second polarizing film 22 and a third substrate 17.

Another characteristic is such that a third polarizing film 23 being a reflection-type polarizing film is disposed below a fourth substrate 18, and the second, polarizing film 22 and the third polarizing film 23 consist of a reflection-type polarizing film.

Since other aspects are the same as those in the second embodiment, the explanation thereof will be omitted.

In a first liquid crystal display panel 100 of the liquid crystal display device arranges the transmission axes of the first polarizing film 21 and the second polarizing film 22 are parallel. When the voltage applied to a liquid crystal layer 15 is low, the display panel 100 shows a strong reflection characteristic and when the voltage is high, it shows a transmission characteristic. The second polarizing film 22 is adhered to the second substrate 13 with an adhesive agent.

By providing an absorption-type polarizing film (a fifth polarizing film) 26 on the first polarizing film 21, when the first liquid crystal display panel 100 is in a transmission state, external light incident on a reflection axis of the reflection-type polarizing film is absorbed by the absorption-type polarizing film 26. Thus, visibility of the display of the second liquid crystal display panel 200 can be improved and the effective utilization of light is achieved by means of multiple reflection of the first polarizing film 21 and the second Polarizing film 22, so that the loss of light due to the double-layer structure of the liquid crystal display panel can be reduced.

Figure 15:
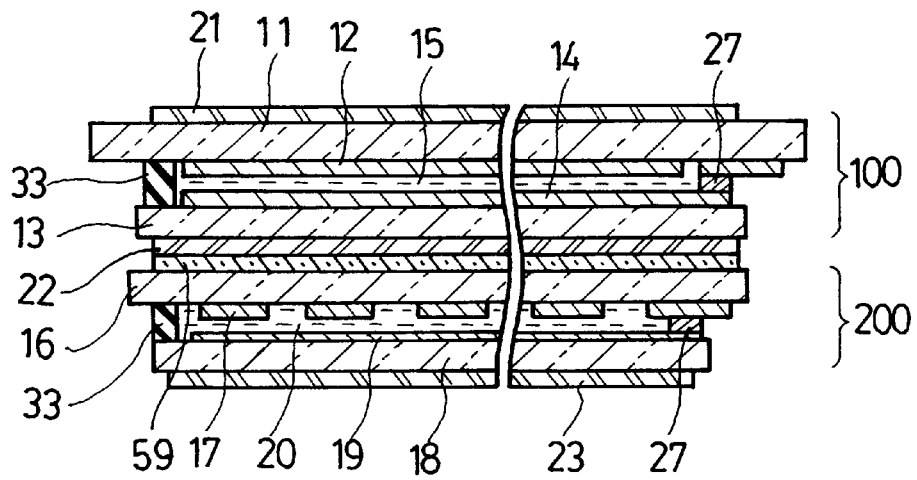
FIG. 15 is an enlarged sectional view of a liquid crystal display panel portion of a liquid crystal display device showing an eighth embodiment of the present invention, in which a middle portion is broken away.

Eighth Embodiment: FIG. 15

Next, the eighth embodiment of the present invention will be explained with reference to FIG. 15.

FIG. 15 is an enlarged sectional view of the liquid crystal display panel portion of the liquid crystal display device in which a middle portion is broken away.

The characteristic feature of the eighth embodiment is such that a super twisted nematic (STN) liquid crystal is adopted as a second liquid crystal layer which is used for the second liquid crystal display panel 200, and an retardation film 59 is provided below the second polarizing film 22.

Since other aspects are the same as those in the first embodiment, explanation thereof will be omitted.

In the liquid crystal display device, since the first liquid crystal display panel 100 is utilized as a shutter, the number of pixels is small. Therefore a twisted nematic (TN) liquid crystal is used as a liquid crystal layer 15. On the other hand, the second liquid crystal display panel 200 adopts a matrix form composed of intersection points of plural striped electrodes as the display pixels. Accordingly, since the number of display pixels is large, a super twisted nematic liquid crystal is used as a liquid crystal layer 20.

For instance, a super twisted nematic (STN) liquid crystal layer is utilized to the second liquid crystal layer 20. And the twist angle thereof is arranged in the range of 210° to 260°.

The retardation film 59 is provided between a second polarizing film 22 and a third substrate 16 to delete birefringent color of the second liquid crystal layer 20. The retardation film 59 is desirably used in an adhered form with the second polarizing film 22 because it is too thin to use alone in a single film form.

By providing a gap between the retardation film 59 and the third substrate 16, the occurrence of interference fringes caused by contact of the second polarizing film 22 with the third substrate 16 is avoided.

The alignment direction in the second liquid crystal layer 20 and the direction of the transmission axis of a third polarizing film 23 depend on the direction of the transmission axis of the second polarizing film 22.

In the embodiment, the twist angle of the super twisted nematic liquid crystal is arranged to be 210°. The product (Δnd) of the gap (d) and the difference, in refractive index (Δn) of the second liquid crystal layer 20 is set to be 845 nanometer (nm). In reference to angles, the direction of the time 3:00 is here defined as zero degrees, the direction of anti-liquid crystal display device is plus (+), and the direction of liquid crystal display device is minus (−).

The alignment direction on the first substrate 11 is set to be −112.5 degrees, and the alignment direction on the second substrate 13 is set to be +97.5°. The direction of the reflection axis of the second polarizing film 22 provided on the second substrate 13 is +45°, and the angle of the retardation film 59 provided between the second polarizing film 22 and the third substrate 16 is +90°.

The retardation value of the retardation film 59 is 575 nanometer (nm). The third polarizing film 23 is disposed in the direction of +90°.

Taking the above described arrangement, the second liquid crystal display panel 200 can perform a normally transparent display, and a display of a segment electrode having a large number of divisions can be performed. In addition, a display having an wide viewing angle can be realized.

Especially, the use of an STN liquid crystal layer is preferable in order to emphasize the transmission characteristic of the second liquid crystal display panel, improve the temperature dependence of the transmission characteristic, improve the viewing angle dependence, and increase the number of divisions of the segment electrode. In order to further improve these characteristics, it is preferable to use an active matrix-type liquid crystal display panel having a switching element at each pixel portion.

It is possible to use a two-terminal type or three-terminal type switching element.

Figure 16:
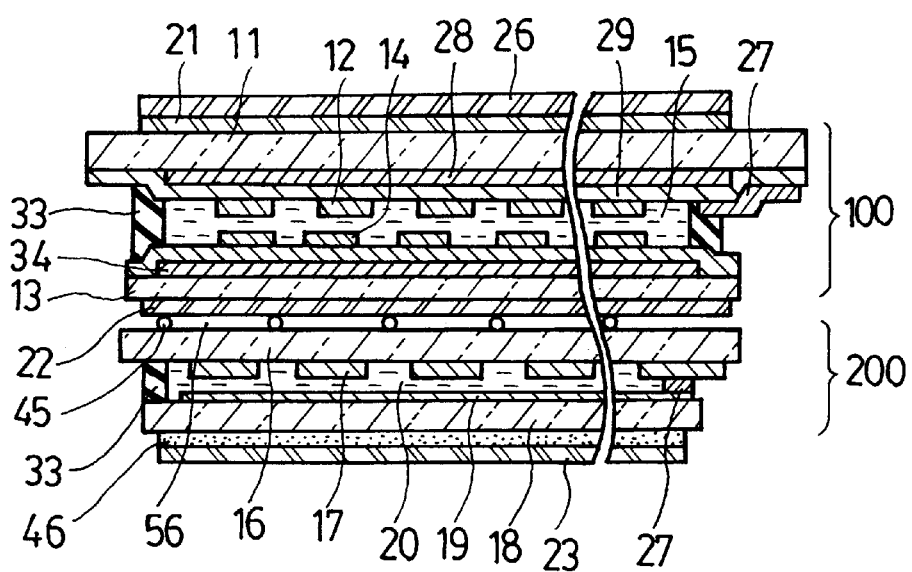
FIG. 16 is an enlarged sectional view of a liquid crystal display panel portion of a liquid crystal display device showing a ninth embodiment of the present invention, in which a middle portion is broken away.
Figure 17:
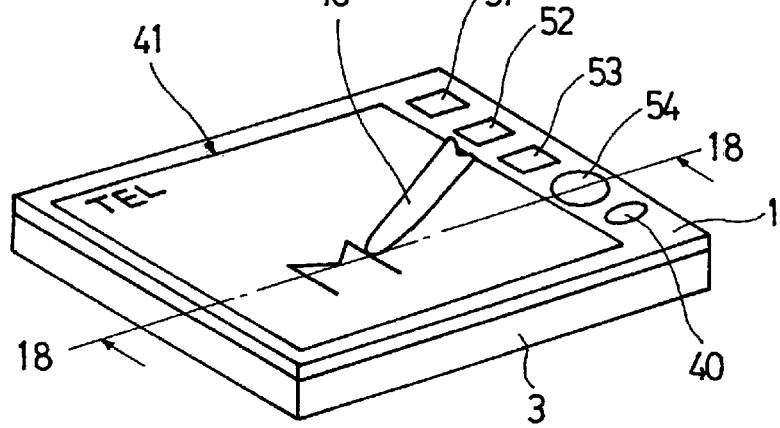
FIG. 17 is a perspective view showing an example of the conventional liquid crystal display device.
Figure 18:
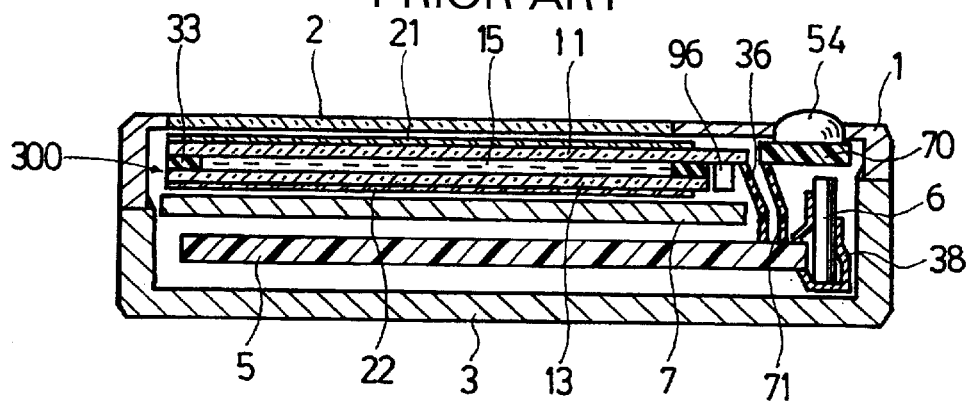
FIG. 18 is a schematic section al view taken along the line 18—18 in FIG. 17.
Figure 19:
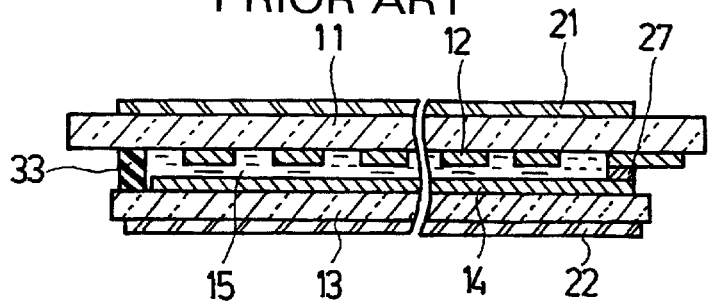
FIG. 19 is an enlarged sectional view of the liquid crystal display panel portion in which a middle portion is broken away.

Ninth Embodiment: FIG. 16

Next, the ninth embodiment of the present invention will be explained with reference to FIG. 16.

FIG. 16 is an enlarged sectional view of the liquid crystal display panel portion of the liquid crystal display device in which a middle portion is broken, away.

The characteristic feature of the ninth embodiment is such that the embodiment has a structure to avoid a region between the segment electrodes used for the first liquid crystal display panel 100 of the liquid crystal display device where a shutter is usually in a closing state.

In FIG. 16, the same components as those in the first embodiment are given the same numerals and the explanation thereof will be omitted.

In this liquid crystal display device, the configuration of the first liquid crystal display panel 100 is provided with, in order from the side visible to a viewer, a first substrate 11, a fifth electrode 28 provided on the first substrate 11, a protection layer 29 having insulation quality, provided on the fifth electrode 28, and a first electrode 12 provided on the protection layer 29. In this embodiment, the fifth electrode 28 is provided in such a manner that it overlays the whole surface of the first electrode 12.

A sixth electrode 34, the protection layer 29, and a second electrode 14 provided on the protection layer 29 are provided on a second substrate 13 facing the first substrate 11 at a predetermined distance, as of the same manner in the first substrate 11, and a portion where the first electrode 12 overlaps the second electrode 14 becomes a display pixel.

In this embodiment, the display electrodes are of the shape so called a segment-type electrode and are divided into plural segments.

In order from the visible side, a fifth polarizing film 26 composed of an absorption-type polarizing film, and a first polarizing film 21 composed of a reflection-type polarizing film, are provided on the first substrate 11. The transmission axes of the first polarizing film 21 and the fifth polarizing film 26 are disposed in parallel.

A second polarizing film 22 composed of a reflection-type polarizing film is provided on the second substrate 13 of the first liquid crystal display panel 100.

By disposing the transmission axes of the first polarizing film 21 and the second polarizing film 22 in parallel, and by combining them with a liquid crystal layer 15, the panel shows a strong reflection characteristic when voltage applied to the liquid crystal layer 15 is low, and shows a transmission characteristic when a high voltage is applied.

The second polarizing film 22 is adhered to the second substrate 13 with an adhesive agent. The first liquid crystal display panel 100 is structured as described above.

When voltage is applied to the first electrode 12 and the second electrode 14 forming the first liquid crystal display panel 100, and the transmission state and the reflection state of the first liquid crystal layer 15 are thereby controlled, since it is difficult to apply voltage between the segment electrodes, a usual reflection state (shutter-close) or usual transmission state (shutter-open) occurs.

However, as shown in this embodiment, the fifth electrode 28 is provided between the first electrode 12 and the first substrate 11, and the sixth electrode 34 is similarly provided between the second electrode 14 and the second substrate 13. By applying voltage between the fifth electrode 28 and the sixth electrode 34, the opening and closing of the shutter can be entirely performed.

In the embodiment, an example in which the fifth electrode 28 and the sixth electrode 34 are provided on the whole surface of the shutter display portion of the first liquid crystal display panel 100 without division is shown. However, by taking a segment electrode structure in which the first electrode 12 and the fifth electrode 28 are disposed on a portion to complement each other and by taking similarly a segment electrode structure in which the second electrode 14 and the sixth electrode 34 are disposed on a portion to complement each other, it becomes possible to cover shutter display lines which exist between the segment electrodes in a plurality.

Next, the structure of the second liquid crystal display panel 200 has, in order from a the visible side of a viewer, a third substrate 16, a third electrode 17, a fourth substrate 18 opposing to the third substrate 16 at a predetermined interval, and a fourth electrode 19 provided on the fourth substrate 18, and an overlapping portion of the third electrode 17 and the fourth electrode 19 is a display pixel.

A matrix type display composed of intersection points of plural striped electrodes is adopted for the display electrode.

Between the third substrate 16 and the fourth substrate 18, provided is a second liquid crystal layer 20 which is filled with a sealing agent 33 and a sealant (not shown).

An alignment layer is provided on the third substrate 16 and the fourth substrate 18 to align the second liquid crystal layer 20 in a predetermined direction.

No polarizing film is provided on the third substrate 16, and the second polarizing film 22 is used in place thereof.

As the third polarizing film 23, a reflection-type polarizing film is provided and is bonded by an adhesive layer to the fourth substrate 18.

By providing a gap 56 between the second polarizing film 22 and the third substrate 16, the occurrence of interference fringes caused by contact of the second polarizing film 22 with the third substrate 16 can be prevented.

Using a reflection-type polarizing film as the second polarizing film 22 and the third polarizing film 23, the second liquid crystal display panel has a high reflection characteristic, and the reflection characteristic of the first liquid crystal display panel can be intensified thereby.

Particularly, when the second liquid crystal display panel is not comprised of a segment electrode structure, and the third electrode 17 and the fourth electrode 19 are formed with a striped electrode structure and an intersection point of the striped electrodes becomes a pixel electrode, since a large area can be controlled to a transmission state or a reflection state, by making the second liquid crystal display panel configured thusly to be in a reflection state on a portion where the first liquid crystal display panel is in a reflection state, an improved reflection characteristic quality can be achieved.

Furthermore, even when the display condition of the first liquid crystal display panel is in a transmission state (shutter-open), the second liquid crystal display panel may display a reflective state or a transmission state, thereby the aftereffects of the reflection state of the first liquid crystal display panel may be left in the display.

Since a portion of light absorbed by the conventional absorption-type polarizing film can be reflected to the viewer side by using multiple reflection of the second polarizing film 22 and the third polarizing film 23, even with a liquid crystal display panel having a two-layer structure a bright display can be realized.

Additionally, when a diffusion layer 46 is provided between the fourth substrate 18 and the third polarizing film 23, and a reflection-type polarizing film is adopted for the third polarizing film 23, it becomes a display to reflect light toward the back surface of the third polarizing film 23 and realize a diffused white-colored display (diffusion effect).

In this case, by providing an optical power generation element such as a solar call, which converts a designated wavelength of light energy to electrical energy on the back surface of the third polarizing film 23, improvement of the contrast ratio and power generation can be achieved at the same time

INDUSTRIAL APPLICABILITY

As is made clear by the above explanation, by adopting plural liquid crystal display panels in an overlapped structure, the display on the lower liquid crystal display panel can be shielded (shuttered) by the upper liquid crystal display panel or, by synchronizing the display of the upper liquid crystal display panel and the lower liquid crystal display panel, a complex display can be realized.

By utilizing for a polarizing film used for plural liquid crystal display panels a reflection-type polarizing film in which one polarization axis is a transmission axis, and another polarization axis intersecting the transmission axis at right angles is a reflection axis, the transmittance and the reflectance can be improved compared to a case wherein a conventional translucent reflecting film is used, and in addition, a mirrored display can be attained.

Regarding the display of an upper layer of the liquid crystal display panel, a reflection display and a transmission display are made possible by using a reflection-type polarizing film between plural liquid crystal display panels. When it becomes the reflection display, the lower layer display can be achieved while securing high transmission quarity.

By displaying a mirrored display in the same color as that of the liquid crystal display device case, the case for the liquid crystal display device and the display of the liquid crystal display panel are given a unified appearance, which differs from the conventional visual impression of a liquid crystal display panel and improves the visually attractive quality of the shutter function of the liquid crystal display panel.

When the display device has a structure in which a first liquid crystal display panel and a second liquid crystal display panel are arranged one on top of the other, by providing the first liquid crystal display panel with an electrode structure changeable between a full reflection state and a transmission state, the display of the lower side liquid crystal display panel can be sharply reproduced when the first liquid crystal display panel is in a transmission state.

When the display device has a structure in which the first liquid crystal display panel and the second liquid crystal display panel are arranged one on top of the other, and a segmented electrode structure or a matrix electrode structure is adopted in the first liquid crystal display panel, the whole display surface can not be in a transmission state, because a predetermined gap is provided between the segment electrodes or between the matrix electrodes.

Therefore, when a font size used for the display of the lower side liquid crystal display panel is smaller than a portion (display pixel) of the segment electrode of the first liquid crystal display panel, it is disposed on the portion of the segment electrode of the first liquid crystal display panel to prevent the shielding caused by the non-transmission portion of the first liquid crystal display panel and to improve the visibility thereof.

When the display of the first liquid crystal display panel is in a reflection state and a transmission state, the display of the second liquid crystal display panel is performed by the combinations of transmission and absorption, transmission and reflection, or transmission and diffusion. Especially, in the transmission state, improvement of the contrast ratio becomes possible by providing a diffused quality.

When it is in a high reflection state with the first liquid crystal display panel and a polarizing film, by performing an entirely uniform reflective display without performing the display of the second liquid crystal display panel, a uniform display appearance can be realized even when a state of the lower layer can be seen through the first liquid crystal display panel in a reflection state.

When using an internal light source, by putting at least a portion of the first liquid crystal display panel under a lighting state, unevenness of the display made apparent by light escaping through the first liquid crystal display panel and the polarizing film can be reduced.

Further, by providing a diffusing layer on a polarizing film arranged below the second liquid crystal display panel, the contrast ratio of the display of the first liquid crystal display panel to the display of the second liquid crystal display panel can be enlarged and at the same time, when the display of the second liquid crystal display panel is performed using an outside light source, the light passing through a portion of the first liquid crystal display panel having a high transmittance is used. Consequently, by providing a means to use a polarizing film as a reflecting film or by providing a reflecting film below the polarizing film, a bright display can be realized.

It is particularly effective to provide a layer having a diffusion quality between a reflection-type polarizing film and a substrate below the second liquid crystal display panel, using the reflection-type polarizing film.

Furthermore by providing a fluorescent ink layer, to perform reflection and emission of light having a specific wavelength when optically excited by incident light, between a polarizing film of the second liquid crystal display panel and a light source, a display having a high contrast ratio can be realized without using a reflecting film.

Since the color of the fluorescent ink layer absorbs or reflects the light in a high energy region through the polarizing film, a bright display can be realized by using a fluorescent ink which shows visible light having long wavelengths.

Since it is difficult to recognize whether a liquid crystal display device works normally when the first liquid crystal display panel has a large reflectance over its whole surface, a portion of the first liquid crystal display panel is utilized. Here, a portion of the first liquid crystal display panel is set in a transmissible state, and the display of the second liquid crystal display panel is set in a visible state. Alternatively, the second liquid crystal display panel is made larger than the first liquid crystal display panel, so that the display of the;, second liquid crystal display panel can be recognizable without depending on the display state of the first liquid crystal display panel.

Alternatively, a liquid crystal display panel arranged below the first liquid crystal display panel is divided in multiple divisions with a portion to perform shielding or display visible through the display of the first liquid crystal display panel and a portion to recognize the display of a third liquid crystal display panel without independing on the display of the first liquid crystal display panel.

As described above, when the display condition of the first liquid crystal display panel functions as a shutter to shield the display of the lower liquid crystal display panel, the movement of a liquid crystal display device can none-the-less be confirmed.

Furthermore, when the first liquid crystal panel is in a high reflection state (shutter closed), by making uniform the display of the second liquid crystal display panel, an overall uniform display can be obtained and the contrast ratio remains high even when the second liquid crystal display panel can be seen through the first liquid crystal display panel.

Additionally, when the second liquid crystal display panel shows a uniform display, by making small or turning off the applied voltage, the power consumption which is an important aspect of the liquid crystal display device can be reduced.

That is, when plural sets of the liquid crystal display panels are used, the power consumption thereof is large compared with the case wherein only one set of the conventional liquid crystal display panel is used, therefore a means for reducing electric power for the display is very necessary and effective.

The embodiments in which a twisted nematic liquid crystal is used for the first liquid crystal layer, and a twisted nematic liquid crystal or a super twisted nematic liquid crystal is used for the second liquid crystal layer, are shown. When considering the cost of a liquid crystal display device, the function of a first liquid crystal layer, and the thickness of a substrate, a twisted nematic liquid crystal is most suitable for the first liquid crystal display layer, but the invention is not limited to the twisted nematic liquid crystal, in particular.

As for the second liquid crystal layer, a twisted nematic liquid crystal or a super twisted nematic liquid crystal is most suitable with regard to the number of divisions of the segment electrode and the viewing angle, which is however, not limited in particular.

In the case of a liquid crystal display device having a pen-input device which can input a signal using the upper portion of the liquid crystal display panel or the wiring of the liquid crystal display panel, a gap is provided between a second polarizing film consisting of a reflecting-type polarizing film arranged on the first liquid crystal display panel and the second liquid crystal display panel, with a spacer. By this structure, interference fringes occurred between the second polarizing film and an opposing substrate can be prevented, and the structure is also effective as a buffer agent when the deflection of the first liquid crystal display panel is transferred to the second liquid crystal display panel.

What is claimed is:

1. A liquid crystal display device, wherein
   a plurality of liquid crystal display panels, each comprised of a liquid crystal layer provided between a pair of transparent substrates which have electrodes formed on each opposing inner surface, are laminated;
   two said liquid crystal display panels being laminated so that at least one of a portion each thereof overlap the other, so that the pair of transparent substrates of each one of said two liquid crystal display panels comprises an inner substrate and an outer substrate; the inner substrate of one of said two liquid crystal panels is placed facing the inner substrate of the other of said two liquid crystal display panels, and the outer substrate of one of said two liquid crystal panels is placed opposite to the other of said two liquid crystal display panels with respect to the inner substrate of said one of the said two liquid crystal display panels; and
   a reflection-type polarizing film which transmits the light linearly polarized in the direction parallel to a transmission axis thereof, and reflects the light linearly polarized in the direction orthogonal to the transmission axis thereof, is arranged between said two laminated liquid crystal display panels in such a manner that the reflection-type polarizing film is placed between the inner substrates of said two laminated liquid crystal displays, and the reflection-type polarizing film is adhered to the inner substrate of one of said two liquid crystal display panels without gap and a predetermined gap is provided between the reflection-type polarizing film and the inner substrate of the other of said two liquid crystal display panels.

2. The liquid crystal display device according to claim 1, wherein said gap between said reflection-type polarizing film and a substrate of said liquid crystal display panel opposing to said reflection-type polarizing film is formed by a printed layer provided in the region surrounding a display region of said liquid crystal display panel.

3. The liquid crystal display device according to claim 1, wherein a plurality of said reflection-type polarizing films are disposed.

4. The liquid crystal display device according to claim 1, wherein the reflection-type polarizing film is adhered to said substrate of one liquid crystal display panel with an adhesive agent without gap.

5. The liquid crystal display device according to claim 1, wherein said predetermined gap is in a range of 5 to 100 μm.

6. A liquid crystal display device, wherein
   two liquid crystal display panels, each comprised of a liquid crystal layer provided between a pair of transparent substrates which have electrodes formed on each opposing inner surface, are laminated to form a laminate;
   said two liquid crystal display panels are laminated so that at least one of a portion each thereof overlaps the other, so that the pair of transparent substrates of each one of said two liquid crystal display panels comprises an inner substrate and an outer substrate; the inner substrate of one of said two liquid crystal panels is placed facing the inner substrate of the other of said two liquid crystal display panels, and the outer substrate of one of said two liquid crystal panels is placed opposite to the other of said two liquid crystal display panels with respect to the inner substrate of said one of the said two liquid crystal display panels;
   a first polarizing film is disposed on a top surface of the laminate formed by the laminated two liquid crystal display panels, a second polarizing film is disposed between the two liquid crystal display panels, and a third polarizing film is disposed on a lowest bottom surface of the laminate;
   said second polarizing film being a reflection-type polarizing film which transmits the light linearly polarized in the direction parallel to a transmission axis thereof, and reflects the light linearly polarized in the direction orthogonal to the transmission axis thereof, and which is arranged between said two laminated liquid crystal display panels in such a manner that the reflection-type polarizing film is placed between the inner substrates of said two laminated liquid crystal displays, and the reflection-type polarizing film is adhered to the inner substrate of one of said two liquid crystal display panels without gap and a predetermined gap is provided between the reflection-type polarizing film and the inner substrate of the other of said two liquid crystal display panels, and
   said liquid crystal display device comprising a light diffusing layer.

7. The liquid crystal display device according to claim 6, wherein
   the top surfaces of said laminated two liquid crystal display panels is arranged facing the visible side,
   the first polarizing film is comprised of an absorption-type polarizing film to transmit the light linearly polarized in the direction parallel to a transmission axis thereof and to absorb the light linearly polarized in the direction orthogonal to the transmission axis thereof,
   the second polarizing film is comprised of said reflection-type polarizing film, and
   the third polarizing film is comprised of a combination of the light diffusion layer, and a reflection-type polarizing film.

8. The liquid crystal display device according to claim 7, wherein said first polarizing film, said second polarizing film and said liquid crystal display panel disposed therebetween are configured to change from a high reflection characteristic to a high transmission characteristic in relation to the visible side by increasing the voltage applied to said liquid crystal display panel.

9. The liquid crystal display device according to claim 8, wherein when the liquid crystal display device is in a state showing a high reflection characteristic in relation to the visible side by means of said first polarizing film, said second polarizing film and a first liquid crystal display panel disposed therebetween, low voltage is applied to a second liquid crystal display panel.

10. The liquid crystal display device according to claim 7, wherein said first polarizing film, said second polarizing film and said liquid crystal display panel disposed therebetween are configured to change from a high transmission characteristic to a high reflection characteristic in relation to the visible side by increasing the voltage applied to said liquid crystal display panel.

11. The liquid crystal display device according to claim 6, wherein the reflection-type polarizing film is adhered to said substrate of one liquid crystal display panel with an adhesive agent without gap.

12. The liquid crystal display device according to claim 6, wherein said predetermined gap is in a range of 5 to 100 μm.

13. A liquid crystal display device, wherein
   two liquid crystal display panels, each comprised of a liquid crystal layer provided between a pair of transparent substrates which have electrodes formed on each opposing inner surface, are laminated, the two liquid crystal display panels are laminated so that at least one of a portion each thereof overlaps the other, so that the pair of transparent substrates of each one of said two liquid crystal display panels comprises an inner substrate and an outer substrate; the inner substrate of one of said two liquid crystal panels is placed facing the inner substrate of the other of said two liquid crystal display panels, and the outer substrate of one of said two liquid crystal panels is placed opposite to the other of said two liquid crystal display panels with respect to the inner substrate of said one of the said two liquid crystal display panels;

a first polarizing film is disposed on an upper surface of a first liquid crystal display panel which is arranged on the viewer side relative to a second liquid crystal display panel, a second polarizing film is disposed between the first liquid crystal display panel and the second liquid crystal display panel, that is the other liquid crystal display panel, and a third polarizing film is disposed on a bottom surface of the second liquid crystal display panel;

the second polarizing film is a reflection-type polarizing film which transmits the light linearly polarized in the direction parallel to a transmission axis thereof, and reflects the light linearly polarized in the direction orthogonal to the transmission axis thereof, and which is arranged between said two laminated liquid crystal display panels in such a manner that the reflection-type polarizing film is placed between the inner substrates of said two laminated liquid crystal displays, and the reflection type polarizing film is adhered to the inner substrate of one of said two liquid crystal display panels without gap and a predetermined gap is provided between the reflection-type polarizing film and the inner substrate of the other of said two liquid crystal display panels;

the first liquid crystal display panel has a plurality of segment display portions, and when a display shows a high transmission characteristic through said first polarizing film, said second polarizing film, and the first liquid crystal display panel, no voltage is applied to the liquid crystal layer in an area between two said segment display portions of the first liquid crystal display panel, said area defining accordingly a steady section having a constantly high reflection characteristic;

said second liquid crystal display panel has a display pixel consisting of a matrix type electrode structure, in which the display pixel of said second liquid crystal display panel is smaller than said steady section; and a font size displayed by the second liquid crystal panel is larger than the steady section of the first liquid crystal display panel.

14. The liquid crystal display device according to claim 13, wherein the reflection-type polarizing film is adhered to said substrate of one liquid crystal display panel with an adhesive agent without gap.

15. The liquid crystal display device according to claim 13, wherein said predetermined gap is in a range of 5 to 100 μm.

16. The liquid crystal display device according to claim 1, wherein said liquid crystal display device is provided with a light diffusion layer consisting of a spacer on at least said reflection-type polarizing film, and the spacer occupies a gap which extends between said reflection-type polarizing film and a substrate opposing to said reflection-type polarizing film.

* * * * *

UNITED STATES PATENT AND TRADEMARK OFFICE
CERTIFICATE OF CORRECTION

PATENT NO. : 6,646,697 B1  Page 1 of 1
DATED : November 11, 2003
INVENTOR(S) : Kanetaka Sekiguchi et al.

It is certified that error appears in the above-identified patent and that said Letters Patent is hereby corrected as shown below:

Column 23,
Line 8, "overlap" should read -- overlaps --.
Line 53, ";" should be -- , --.

Column 24,
Line 4, ";" should be -- , --.
Line 19, "panels, and" should read -- panels, --.
Line 34, "layer, and" should read -- layer and --.

Column 25,
Line 21, ";" should be -- , --.
Line 31, "reflection type" should read -- reflection-type --.

Column 26,
Lines 2, 12 and 16, ";" should be -- , --.
Line 9, "the first liquid" should read -- said first liquid --.
Line 31, "extends" shoud read -- exists --.

Signed and Sealed this

Twenty-fourth Day of August, 2004

JON W. DUDAS
*Director of the United States Patent and Trademark Office*